Feb. 28, 1967 H. MAHN 3,306,509

DEVICE PROCESSING PERFORATED TAPE WITH TIME TRACK

Filed Feb. 12, 1965 2 Sheets-Sheet 1

INVENTOR.
HERBERT MAHN
BY
Frank R. Jifani
AGENT

Feb. 28, 1967 H. MAHN 3,306,509

DEVICE PROCESSING PERFORATED TAPE WITH TIME TRACK

Filed Feb. 12, 1965 2 Sheets-Sheet 2

INVENTOR.
HERBERT MAHN
BY
AGENT

United States Patent Office 3,306,509
Patented Feb. 28, 1967

3,306,509
DEVICE PROCESSING PERFORATED TAPE WITH TIME TRACK

Herbert Mahn, Hamburg-Garstedt, Germany, assignor to North American Philips Company, Inc., New York, N.Y., a corporation of Delaware
Filed Feb. 12, 1965, Ser. No. 432,203
Claims priority, application Germany, Mar. 7, 1964, P 33,784
4 Claims. (Cl. 226—43)

In a tape or strip drive for record carriers, in particular perforated tape, no transverse movement of the punch perforating the tape with respect to the tape or conversely may occur during punching. So the transport movement of the tape, at least in the area of punching, must take place stepwise and the division steps must be maintained very accurately. So it must be possible to operate the tape transport in a start-stop manner.

From cinematographic technology film-transport mechanisms are known which derive the division step from non-uniformly transmitting transmissions, for example, transport gear-wheel engagement with a Geneva-wheel, D-claws with a crank mechanism and striking mechanism with a two-throw crank. Further it is known in perforated tape technology to cause a plate to oscillate in the amplitude of a division step in the direction of the tape opposite to the tape channel fixedly arranged in the housing. The tape is forced alternately against the housing and against the oscillating plate and thus transported in steps, for example, with a friction claw driven by a crank gear.

Normally the film-transport mechanisms operate at a picture frequency of 24 c./s. Increase of the frequency and start-stop operation are not possible owing to the forces due to inertia occurring in the range of such frequencies. When using the friction claw it is difficult to proportion the division steps obtained by means of friction at the perforated tape very accurately and to maintain the tolerance of the sum errors within the limits set.

The invention relates to a device for processing perforated tape with time track, in which the tape to be processed runs at uniform speed outside the device. According to the invention the perforated tape device is characterized in that two alternately operating tape store-mechanisms are present for the tape to be processed between them which ensure that the tape in the intermediate space performs a stepwise transport movement, the length of the steps being limited by a pulse source, for example, in the form of a photoelectric cell relay, and a magnetic brake controlled by the time track.

The new perforated-tape device permits a very rapid and accurate start-stop operation which renders it possible to use this device advantageously for supplying information. The tape store-mechanisms in the transport system further make it possible to compensate the difference in movement between the intermittent braking and the uniform forward movement of the tape by the transport roller. The tape speed shortly before actuating the brake is reduced and the spreading of the length of brake path thus decreased. In addtion, the reduction of the tape speed during braking results in a decrease of the wear of the friction surfaces. The processing, for example, the punching itself, is carried out while the tape is at rest. The perforated tape is held by the brake magnet in the rhythm of punching.

Figure 1:
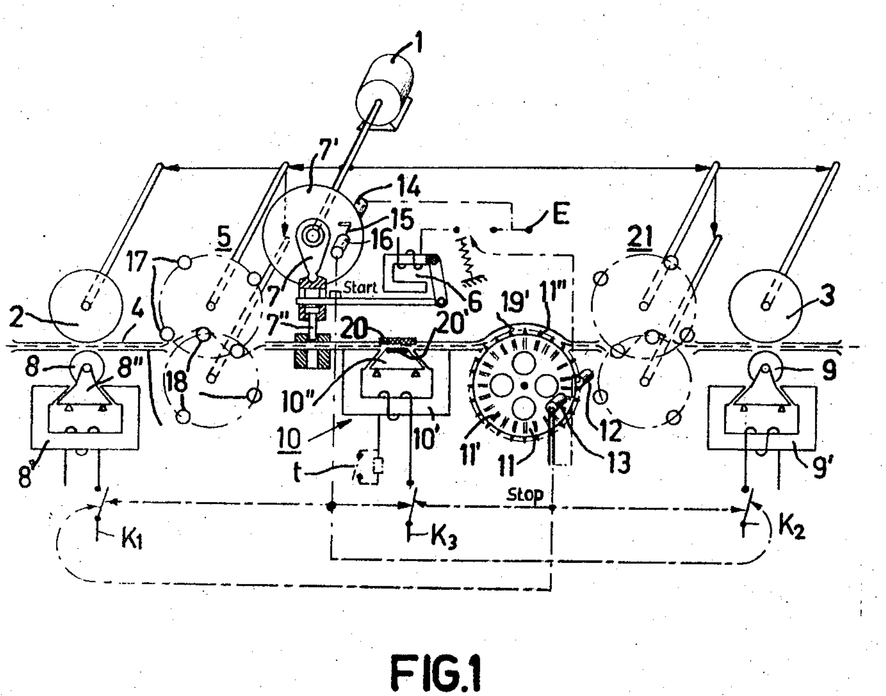
Figure 2:
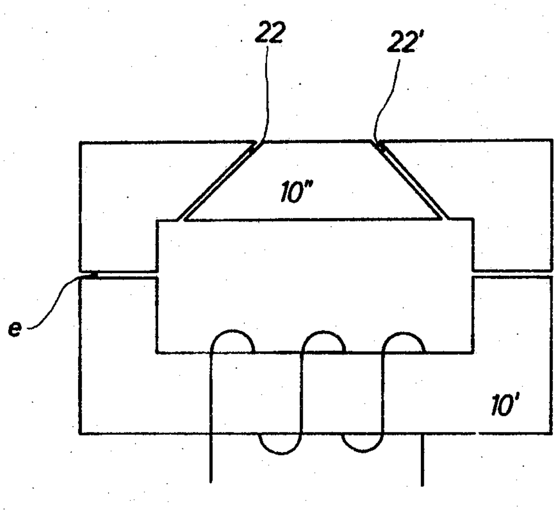
Figure 3:
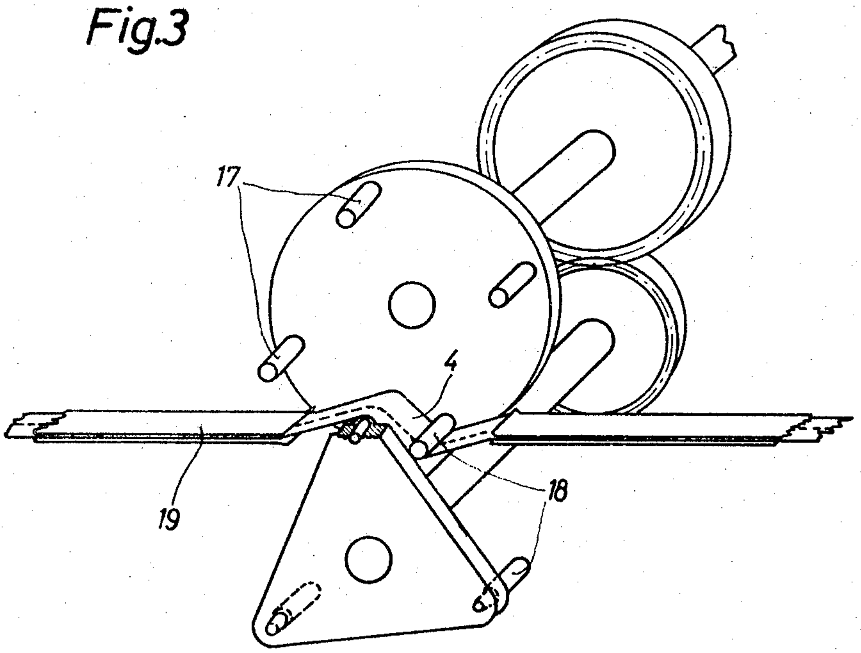

In order that the invention may readily be carried into effect, it will now be described in greater detail, by way of example, with reference to an embodiment in the drawing, in which FIG. 1 diagrammatically shows the whole device, FIG. 2 shows part of the magnetic brake and FIG. 3 shows part of the tape store-mechanism.

A perforated tape is already provided beforehand throughout its length with a transport perforation. The pitch of the transport perforations, sometimes termed time track, corresponds to the pitch of the information tracks.

The perforation pitch present is derived from the tape by means of a photoelectric cell relay and supplied to the transport mechanism on the one hand to control braking and on the other hand to introduce the processing, for example, the punching operation. Referring now to FIG. 1, a driving motor 1 drives, through suitable transmissions, the driving rollers 2 and 3 for the tape 4 operative in the same direction and the tape store-mechanisms 5 and 21 as well as the processing device, in the present case a punch 7. The transportation of the tape is carried out by the magnetically-operated driving rollers 8 and 9, braking is effected by the magnetic brake 10. A sprocket-wheel 11 cooperates with the time track of the tape 4 which wheel serves as a light barrier between the light source 12 and the photo element 13.

As soon as the magnetic brake has stopped the tape 4, punching is effected via the control 6 of the punches. The actual supply of information occurs at E. The necessary electric connections are only diagrammatically shown in FIG. 1. By a transmission member 7' coupled to the punching mechanism the starting pulse is supplied to the transport mechanism 8, 9 at the instant at which the punches 7'' leave the plane of the tape, namely by a pulse impinging from the light source 14 through the gap 15 on the photo element, as a result of which the contacts $K_1$, $K_2$ and $K_3$ are operated in the required manner. The brake 10 is then released and the tape 4 is moved by one pitch, the end of the pitch being determined by the photo relay 11, 12, 13.

The tape store-mechanism 5 runs in synchronism with the driving roller 2 and the punching mechanism 7. It rotates at uniform speed, although it is to transmit a certain non-uniform movement to the tape 4. This movement is determined by the supply of tape to be formed and by the most favourable distribution of speed of the tape. The supply of tape is determined in that, when the brake 10 is released, in addition to the uniformly moving tape 4 that length of tape must be drawn through the braking and punching mechanism which is transported during the punching period by the uniformly running driving roller 2.

The tape store-mechanism exerts this buffering function by means of rotating intermeshing pins 17 and 18 which, alternately intermeshing, "lengthen" and "shorten" the perforated tape 4. Structurally it is possible to vary the storage volume of the pins by displacing their pitch circles. This may be effected through the interior of the shaft (FIG. 3).

The store-mechanism is constructed according to the graphical methods of the transmission technology which need no further explanation in this connection.

The movement of the store-mechanism must satisfy the following conditions:

With the brake 10 released, the moving mechanism must pull through nearly the whole length of pitch at an approximately sinusoidal speed variation superimposed upon the uniform tape pulling movement, then delay the tape speed, shortly before the end of the pitch step, to the comparatively low speed in preparation of the actuating of the brake, and finally, when the brake is closed, supply the stored portion of the length of pitch to the driving roller which constantly rotates uniformly. The store-mechanism must keep the perforated tape as taut as possible. Outside the store-mechanism 5 and the driving roller 2, the perforated tape must be guided in the closed channel 19 to ensure that no uncontrollable vibrating movements can disturb the exact longitudinal steps.

The possibility presents itself to arrange the tape store-mechanisms 5 and 21 in pairs so that they enclose the sprocket-wheel 11, the brake 10 and the punching mechanism 7. In this case they must run at a mutual phase shift of half a phase so that one serves for accelerating and the other serves for delaying the tape. Inside the tape store-mechanisms the pulling through of the tape occurs in steps and outside the mechanisms uniformly. In the whole device with the winding and unwinding mechanisms a second pair of pressure rollers 3 and 9 may be provided before the second store-mechanism 21.

The tape store-mechanisms 5 and 21 may be constructed so that with one rotation more than one step can be taken. As a result of this it is possible to construct the transmission, which ensures the synchronous running of all the mechanisms engaged with the tape transportation, for normal numbers of rotation. In order to be able to use a tape with a given tensile strength for a signal frequency which is as high as possible, the tape store-mechanisms can best be constructed so that the tape is accelerated uniformly.

The magnetic brake 10 retains the perforated tape 4 during the punching operation and must retain it further in this position as long as the tape is stopped during none too short a period, the pressure roller 2 and the tape store-mechanism 5 proceeding, until the following series of signs has to be punched. The part of the tape 4 which is braked and has not yet been punched each time is the starting position for the next sign irrespective of the fact whether this arrives immediately after punching a sign or only later. The braking magnet 10′ must be supplied so that during a stop-start interval, which lasts somewhat longer, it obtains a smaller holding current, but during the normal start-stop interval which may be effected by means of the device *t*, it obtains the full holding current. The accuracy of a division step is determined not only by the influence of intermeshing of the tape with the sprocket-wheel and the influence of the control by the phot relay, but also by the spreadings of the length of brake path. The spreading of the length of brake path must be reduced by the following device:

It is known to brake the perforated tape in the air gap between a magnet and an armature. If the comparatively small friction value of the combination steel-paper-steel were to be improved by lining the friction surfaces with a better friction lining, the air gap would be enlarged by the thickness of these linings and consequently the brake pressure be reduced considerably. However, it is also unfavourable to increase the brake pressure of the magnet by increasing the number of ampere turns, since the response period of the magnet increases quadratic with this increase.

Therefore, the brake magnet 10′ and the armature 10″ are arranged on the same side of the perforated tape 4 and only the oppositely located supporting surface 20, which is rigidly connected to the housing, is provided with a lining which, in addition to great resistance to wear, has a constant high coefficient of friction. When this lining 20′ is also provided on the armature surface, it increases the mass to be accelerated of the armature, it is true, but has no harmful influence on the air gap. The armature 10″ as shown in FIG. 2 forms part of the rectangular closed magnet core 10′ and is cut out by two gaps 22 and 22′ located at an angle of 45°. The angle of the gaps may be varied for certain force-route-ratios. The air gap *e* may also be omitted.

The brake also permits of using friction linings having a higher coefficient of friction than steel. In the choice of the friction lining, however, its elasticity must also be taken into account. This elasticity must be large so that in the depths of roughness of the paper, the retaining by means of the friction changes into retaining by means of the shape. This elasticity may not become larger than is required for this purpose so as to avoid the need for increasing the stroke of the brake armature 10″ because of the resiliency of the friction lining. As a friction lining which distinguishes by a great diversity in degrees of hardness, very high resistance to wear and very small plasticity may be recommended polyurethane-elastomers.

It is recommendable to use a sprocket-wheel 11 as a light barrier for the photo relay which runs in the time track of the tape 4 and comprises gaps 11′ which actuate the photo relay 12, 13. The inertia force which is as small as possible of this sprocket-wheel 11 intermittently moving with the transport of the tape 4 and the radius of the gaps 11′ which is as large as possible must stand in an optimum relation to each other, of which relation the limit is given by the contact surface of the pins 11′ in the time track holes. The permissible frequency of the stepwise pulling of the perforated tape is determined by the rigidity of the sides (contact surface) of the transport perforations, through which the photo relay-sprocket wheel is driven and by the mass inertia moment of this sprocket-wheel.

When simultaneously more than one pin 11″ intermeshes with the tape, the chance of deformation of the perforations becomes smaller. The sprocket-wheel 11 is turned with a thin wall from aluminum, the gaps 11′ are radially sawed and finally the wheel is anodised black. The short shaft is journalled in jewel bearings with pivots. The tape 4 is guided over an arc of approximately 90° in the closed channel 19′ over the sprocket-wheel 11, the pins of which engage in the time track through a gap in the channel. As a result of this, the shaft of the sprocket-wheel is not loaded by the tape in the radial direction. A small rectangular slit diaphragm may be provided in the strong light flux of the photo relay between the gap of the sprocket-wheel and the photo diode 13. In the embodiment described the sprocket-wheel 11 operates a photo relay which controls the magnets for the brake and the pressure rollers. It is quite well possible to actuate, through cams connected to the sprocket-wheel, preferably several phase-shifted contacts or to construct an inductive device. The friction drive of the perforated tape 4 by means of the constantly rotating driving roller 2 is controlled by the magnetically operated pressure roller 8 which forces the tape against the driving roller 2 by being in direct contact with the tape. When punching is carried out in blocks, the whole block is started once by the pressure roller magnet 8′ and 9′ respectively and stopped at the end. Naturally, the start-stop condition must also be fulfilled for separate symbols. The starting instant must be controlled independently of the position of the supply wheel. This instant coincides with energized brake. The pressure roller 8 is immediately connected to an armature 8″ in the same manner as described above for the magnetic brake. The bearing block of the pressure roller 8 must be connected to the armature 8″ so that no eddy current losses occur, i.e. the bearing block may not surround the core of the armature when it is constructed of conductive material.

What is claimed is:

1. Apparatus for processing perforated tapes, comprising a perforating station, means for advancing the tape to the perforating station, means interposed between the perforating station and the advancing means for producing cyclically recurring acceleration and deceleration of the tape at the perforating station, said latter means comprising a first member rotatable about a given axis and comprising a plurality of pin members uniformly distributed in a circular pattern and projecting into the path of said tape and successively engaging the same, a second member rotatable about an axis spaced from the axis of the first member and rotating in synchronism with the rotation of said first rotatable member, said second member comprising a plurality of pin members uniformly distributed in a circular pattern and projecting into the path of said tape and interleaving the pin members of said first rotatable member thereby to cyclically vary the path length of the tape between said tape advancing means and said perforating station, tape braking means arranged adjacent to said perforating station, and tape length measuring means actuated by said tape and arranged to produce successive signal pulses upon the passage of successive predetermined lengths of tape, said measuring means being coupled to said braking means for actuating said braking means thereby to intermittently stop the tape.

2. Apparatus for processing perforated tapes as claimed in claim 1 wherein said means for advancing the tape comprises at the beginning and end of the tape path respectively first and second driving pulleys rotating at substantially constant speed and first and second electromagnetically actuated means for positioning said tape in contact with the respective pulleys and wherein said apparatus further comprises means for cyclically varying the path length of the tape between said second driving pulley and said tape length measuring means.

3. Apparatus for processing perforated tapes as claimed in claim 2 comprising means for actuating said perforating means and said path length varying means in synchronism and wherein said perforating means comprises means for generating a control signal upon completion of perforating the tape, and means responsive to said signal for releasing said braking means and actuating said tape positioning means.

4. Apparatus as claimed in claim 3 wherein said tape length measuring means comprises a sprocket wheel having a plurality of apertures as determined by the number of sprocket teeth of said wheel and a photoelectric system actuated in synchronism with the rotaton of said wheel through said apertures for producing said successive signal pulses.

References Cited by the Examiner

UNITED STATES PATENTS

| | | | |
|---|---|---|---|
| 1,954,349 | 4/1934 | Dewey | 226—114 X |
| 3,177,749 | 4/1965 | Best | 226—42 X |

M. HENSON WOOD, Jr., *Primary Examiner.*

R. A. SCHACHER, *Assistant Examiner.*